A. MEHLFELDER.
INTERMITTENT MOTION MECHANISM.
APPLICATION FILED JUNE 13, 1913.
1,225,151.
Patented May 8, 1917.
2 SHEETS—SHEET 1.
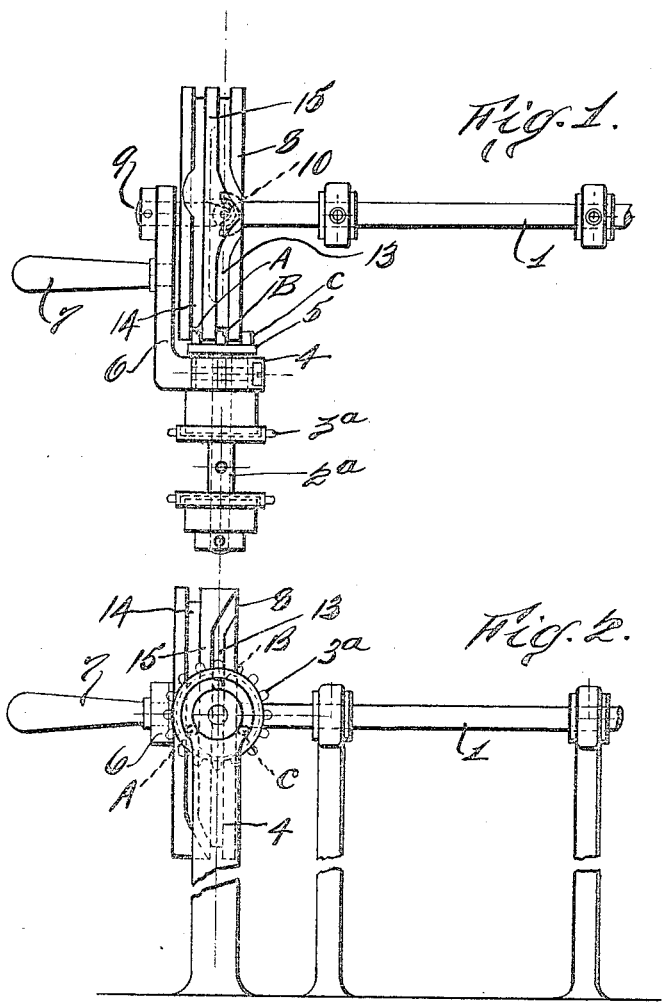

A. MEHLFELDER.
INTERMITTENT MOTION MECHANISM.
APPLICATION FILED JUNE 13, 1913.
1,225,151.
Patented May 8, 1917.
2 SHEETS—SHEET 2.
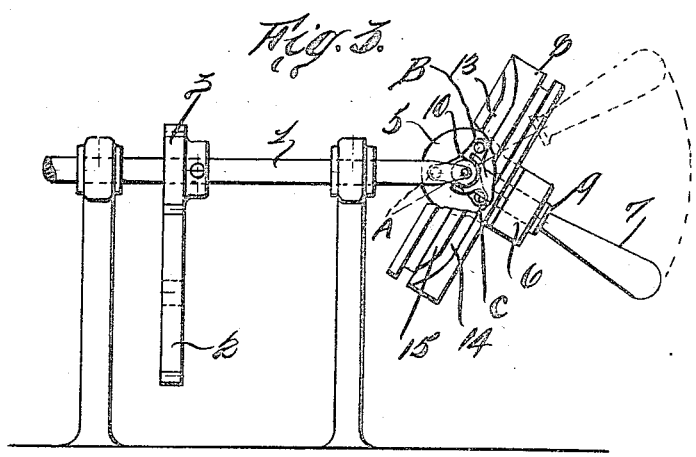
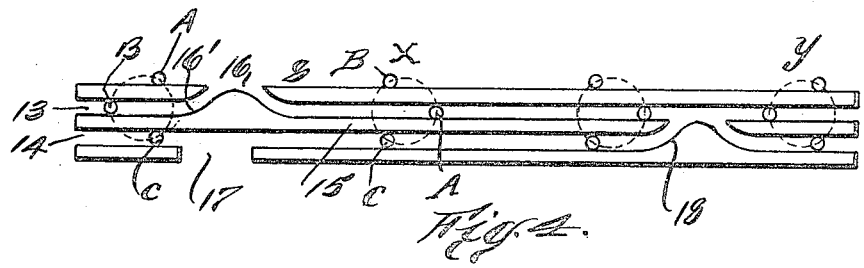

UNITED STATES PATENT OFFICE.

ANTON MEHLFELDER, OF NEW YORK, N. Y.

INTERMITTENT-MOTION MECHANISM.

1,225,151.	Specification of Letters Patent.	Patented May 8, 1917.

Application filed June 13, 1913. Serial No. 773,394.

*To all whom it may concern:*

Be it known that I, ANTON MEHLFELDER, a subject of the Emperor of Germany, residing at New York city, in the county and State of New York, have invented certain new and useful Improvements in Intermittent-Motion Mechanism, of which the following is a clear, full, and exact description.

The object of this invention is to provide an improved mechanism for intermittently rotating a shaft such as the intermittent film moving shaft of a moving picture machine, and further to change during operation the relative motion of the shaft with regard to the constantly driving shaft, a feature which permits my device to be used in the moving picture machine to correct the framing of the picture when projected.

In carrying out this invention, I make use of a continually operating shaft carrying on its axis and rotating with a cylindrical cam wheel, and I provide means for shifting the plane of said cam wheel with relation to the axis of the driving wheel, the cam wheel being universally connected to the drive wheel on one side and pivotally connected to a shifting frame controlled by a shifting handle on the other side.

I provide the intermittent motion shaft shown in this case as provided with sprockets for moving the film with an operating disk provided with three studs to engage alternately the cam grooves of the cam disk, as will be hereinafter described, so that twice in one revolution of the cam disk the stud disk will be turned and moved the required distance of throw during normal operation. If it is desired to change the framing of the picture, the control handle is shifted to move the cam slot and the stud an increased distance, and maintain it in such relation with the driving wheel until the handle is again operated.

The scope of my invention will be pointed out in the claims.

In the accompanying drawings:

Figure 1 is a plan view of so much of a continuously driving shaft and intermittently rotated shaft to show the connection of my mechanism thereto.

Fig. 2 is a front elevation of the mechanism shown in Fig. 1.

Fig. 3 is a view partly broken away of the device of Fig. 2, taken from the opposite side.

Fig. 4 is a diagram of the cam slots of the control disk.

As shown in the drawings, 1 indicates the continuously rotating shaft driven by a gear 2, and pinion 3 fast on the shaft; $2^a$ indicates the shaft for the intermittently moving film advancing reel $3^a$. The shaft $2^a$ is mounted in a frame 4 on one side of which frame secured to the shaft is a disk 5 provided with three studs A, B and C. Rotating on the shaft $2^a$ is the arm 6 with operating handle 7, to the free end of which is rotarily secured the cam wheel 8 by a stud 9 in the arm 6. The stud 9 has a universal joint at 10 with the continuously rotating shaft 1 and the cam is carried by the stud 9, so that on shifting the handle 7 as indicated in the drawings by dotted lines, Fig. 3, the cam can be turned into a different plane with relation to the studs A, B and C, and move said studs in accordance with the extent of the movement thereby changing the framing of the picture. The cam wheel 8, as shown in Fig. 4, is provided with two grooves 13 and 14, practically parallel and separated by a strip 15. The groove 13 opens to the outside of the cam wheel at 16, so that the stud B will ride up the slope at the point 16′, rotate the shaft of the disk, force the stud A down the inclined side, and into the groove 13, as shown in dotted lines at X, Fig. 4. The stud C is free to swing to the left through an opening 17 at the side of the groove when the studs A and B are traveling the part 16 of the cam, so that after passing the cam opening 17 the stud C will be in the position shown in Fig. 4 at X. The stud C will then be forced up the incline 18, the stud A depressed into the slot 13, the stud B merely being shifted when they will occupy the position shown at Y in Fig. 4. Then the operation will repeat, the disk and studs being given one-third of a revolution at every half revolution of the cam.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense.

It is furthermore desired to be understood that the language used in the following claims is intended to cover all the generic and specific features of the invention herein described, and all statements of the scope of the invention which as a matter of language might be said to fall therebetween.

I claim as my invention:

1. An intermittent motion mechanism having a continuously rotating shaft, a cam mounted thereon, said cam having peripheral grooves, an intermittent shaft having a plurality of projections to be engaged by the peripheral grooves of the cam to impart an intermittent motion to said shaft, and a support for said continuously rotating cam and shaft adapted to shift the cam in its relative position to the driven shaft for the purpose of deducting from or adding to the regular rotation of the intermittent shaft independently of the intermittent motion.

2. The herein described intermittent motion mechanism comprising a drive shaft in two parts universally joined together, a cam carried by one part and free for oscillation, a driven shaft having cam engaging elements adapted to engage the aforesaid cam in all positions of its oscillations.

3. The herein described intermittent motion mechanism comprising a drive shaft in two parts universally joined together, a cam carried by one part and free for oscillation, a driven shaft having cam engaging elements adapted to engage the aforesaid cam in all positions of its oscillations, the cam having peripheral grooves.

4. The herein described intermittent motion mechanism comprising a drive shaft in two parts universally joined together, a cam carried by one part and free for oscillation, a driven shaft having cam engaging elements adapted to engage the aforesaid cam in all positions of its oscillations, the cam having peripheral grooves, and the axial line of the driven member coinciding with the axis of the universal joint.

5. A driving shaft and bearings therefor, a continuation of such shaft, a universal joint connecting the two, a cam mounted to oscillate with the continuation upon said universal joint and a driven member engaged by the cam.

6. A driving shaft and bearings therefor, a continuation of such shaft, a universal joint connecting the two, a cam mounted to oscillate with the continuation upon said universal joint and a driven member engaged by the cam, said driven member having studs engaging peripheral grooves in the cam.

7. The herein described device consisting of a driving shaft, a cam thereon, an intermittently rotating shaft, cam engaging means carried thereby, in combination with means for shifting the intermittent shaft to a limited extent without regard to the time of operation of said shaft by the driving shaft.

8. The herein described device consisting of a continuously rotating shaft, an intermittently moving shaft, means between the two for imparting motion from one to the other intermittently in combination with means for changing the relative time of operation of the intermittent shaft without regard to the continuously rotating shaft.

9. The herein described device consisting of a continuously rotating shaft, a cam thereon, an intermittently rotating shaft, means thereon carried thereby in engagement with the cam in combination with means for shifting the intermittent shaft to a limited degree without regard to the time of operation of the intermittent shaft.

10. An intermittent motion device consisting of an intermittent shaft having a plurality of projections, a peripheral cam having grooves, a continuously rotating shaft, said grooves engaging the projections of said intermittent shaft for the purpose of imparting motion from one to the other, and a support for said cam adapted to shift the cam to increase or reduce the rotation of the intermittent shaft.

Signed at New York city, New York, this 7th day of June, one thousand nine hundred thirteen.

ANTON MEHLFELDER.

Witnesses:
Wm. A. Hayes,
Henry L. Rupert.